(12) United States Patent
Birjandi et al.

(10) Patent No.: US 7,562,812 B2
(45) Date of Patent: Jul. 21, 2009

(54) REDISTRIBUTION OF PARTS IN A DISTRIBUTION NETWORK

(75) Inventors: Rosa H. Birjandi, Newton, MA (US); Omer Bakkalbasi, Mahopac, NY (US); Dharmaraj Veerappanaicker, Quincy, MA (US); Joel A. Shapiro, Watertown, MA (US)

(73) Assignee: i2 Technologies US, Inc., Dallas, TX (US)

( * ) Notice: Subject to any disclaimer, the term of this patent is extended or adjusted under 35 U.S.C. 154(b) by 104 days.

(21) Appl. No.: 11/696,297

(22) Filed: Apr. 4, 2007

(65) Prior Publication Data

US 2007/0185760 A1 Aug. 9, 2007

Related U.S. Application Data

(62) Division of application No. 10/033,103, filed on Oct. 25, 2001, now Pat. No. 7,210,624.

(60) Provisional application No. 60/243,659, filed on Oct. 26, 2000.

(51) Int. Cl.
*G06F 7/00* (2006.01)

(52) U.S. Cl. .......................................... 235/376; 705/8
(58) Field of Classification Search .................. 705/28, 705/7–10; 235/376; 703/1, 2, 21; 709/203, 709/223
See application file for complete search history.

(56) References Cited

U.S. PATENT DOCUMENTS

| 5,287,267 A | 2/1994 | Jayaraman et al. |
|---|---|---|
| 5,765,143 A | 6/1998 | Sheldon et al. |
| 5,819,232 A | 10/1998 | Shipman |
| 5,946,662 A | 8/1999 | Ettl et al. |
| 5,960,414 A | 9/1999 | Rand et al. |
| 6,006,196 A | 12/1999 | Feigin et al. |
| 6,205,431 B1 | 3/2001 | Willemain et al. |
| 6,341,271 B1 | 1/2002 | Salvo et al. |
| 6,379,199 B1 | 4/2002 | Chen |

(Continued)

FOREIGN PATENT DOCUMENTS

EP 1722317 A 5/2005

(Continued)

OTHER PUBLICATIONS

Robert Bianco, Minimize total landed cost: Strategize, Model, Act. Jan. 2006, http://www.inboundlogistics.com/articles/3plline/3plline0106.shtml.

(Continued)

*Primary Examiner*—Andrew Joseph Rudy
(74) *Attorney, Agent, or Firm*—Booth Udall, PLC; Steven J. Laureanti

(57) ABSTRACT

Redistributing parts includes defining locations. An actual inventory of parts is established among the locations, and a desired allocation of the parts is established among the locations. A demand for the parts at each location is determined using the actual inventory and the desired allocation. Paths are determined, where a path transfers an excess part from one location to another location. A transfer function describing a cost of transferring the excess part along the paths is generated. The transfer function is optimized to achieve the desired allocation of the excess parts at a minimum cost.

9 Claims, 4 Drawing Sheets

U.S. PATENT DOCUMENTS

| | | | |
|---|---|---|---|
| 6,516,301 | B1 | 2/2003 | Aykin |
| 6,609,101 | B1 | 8/2003 | Landvater |
| 6,671,673 | B1 | 12/2003 | Baseman et al. |
| 6,801,901 | B1 | 10/2004 | Ng |
| 6,954,734 | B1 | 10/2005 | Kuelbs et al. |
| 7,003,474 | B2 | 2/2006 | Lidow |
| 7,130,807 | B1 * | 10/2006 | Mikurak ................ 705/7 |
| 7,210,624 | B1 * | 5/2007 | Birjandi et al. ............ 235/385 |
| 7,363,249 | B1 * | 4/2008 | Boesjes ................ 705/26 |
| 2005/0160121 | A1 | 7/2005 | Kawabata et al. |
| 2008/0040183 | A1 | 2/2008 | Birjandi et al. |

FOREIGN PATENT DOCUMENTS

| | | |
|---|---|---|
| WO | WO20070060985 A1 | 5/2007 |
| WO | WO2007078371 A2 | 7/2007 |

OTHER PUBLICATIONS

U.S. Appl. No. 10/032,971, filed Oct. 25, 2001, entitled "Optimized Deployment of Parts in a Distribution Network", 40 total pages.

* cited by examiner

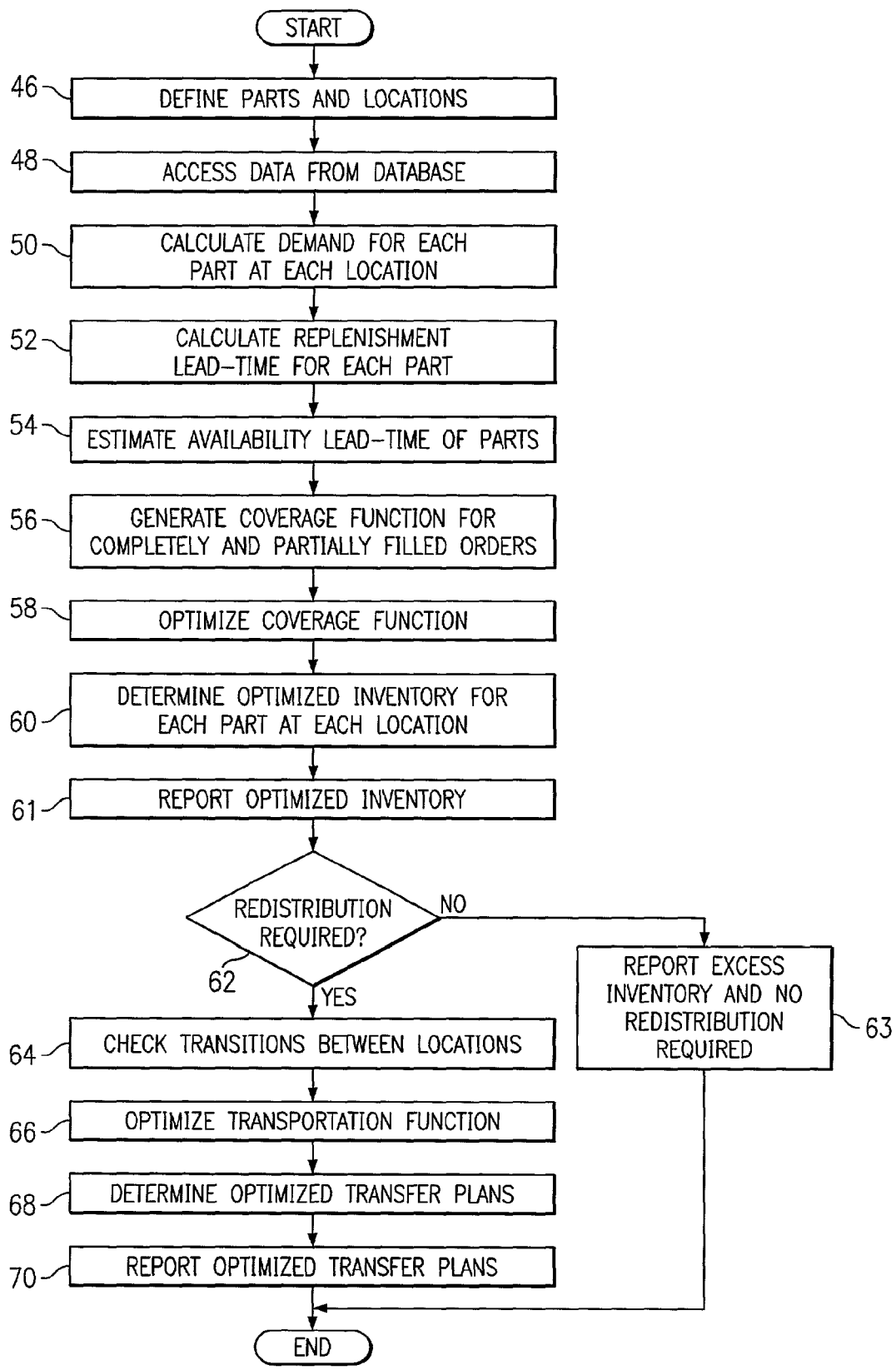

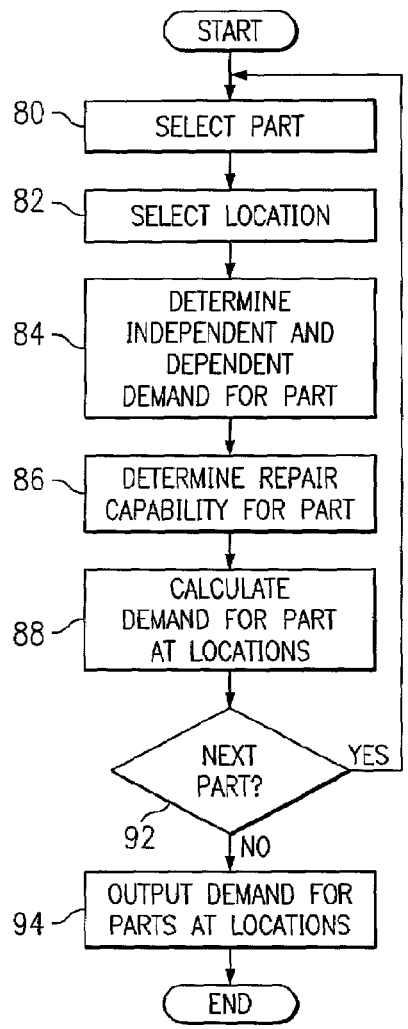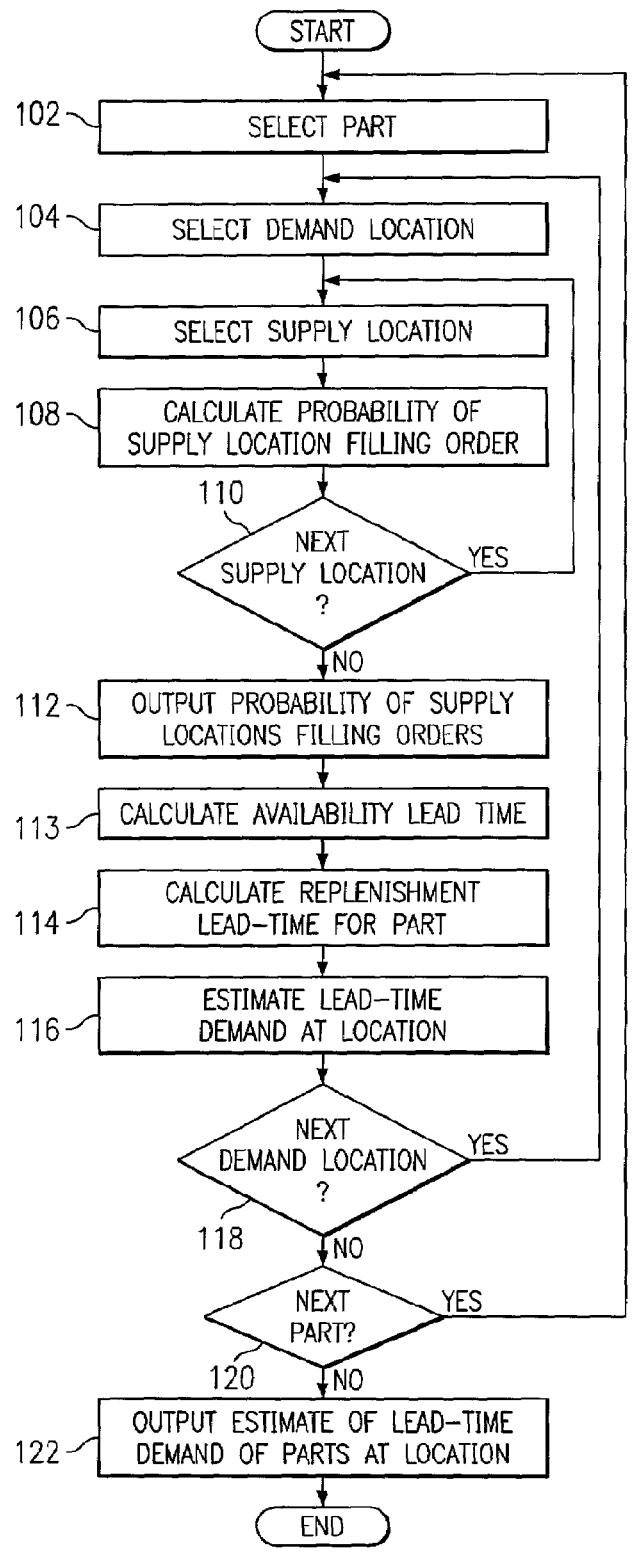

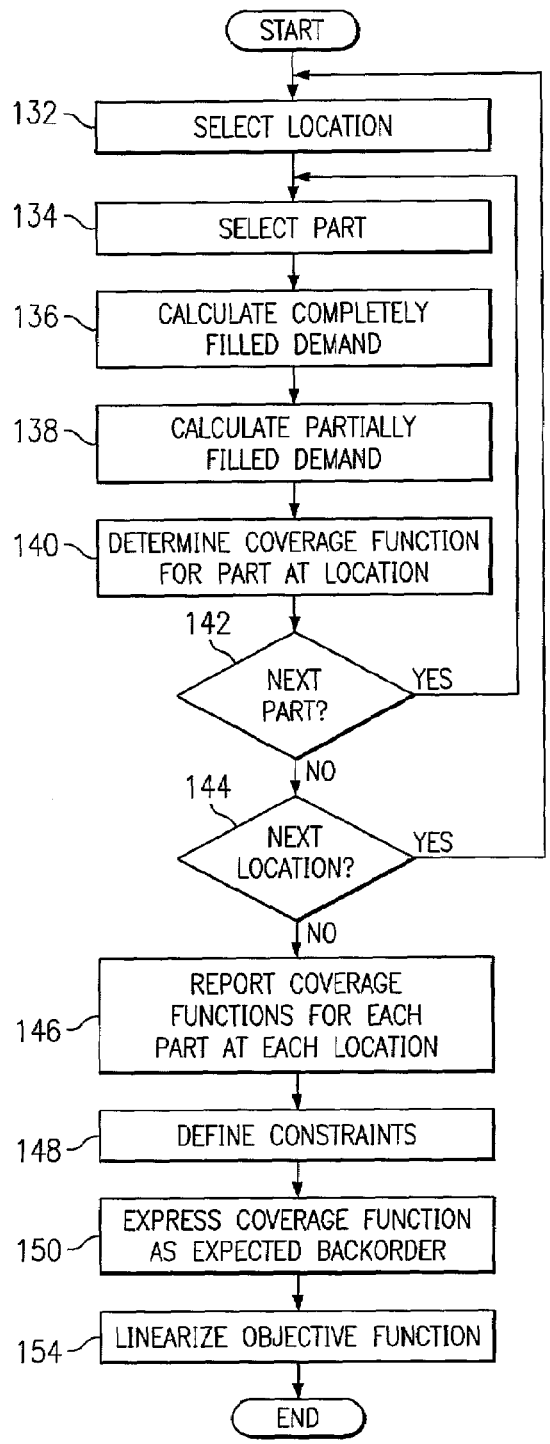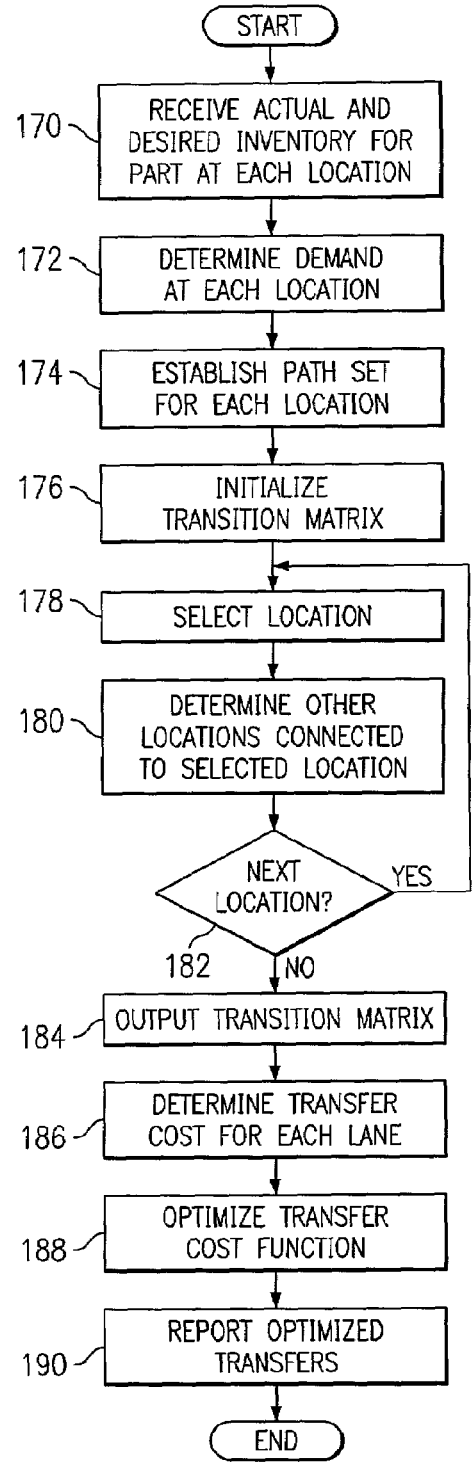

REDISTRIBUTION OF PARTS IN A DISTRIBUTION NETWORK

RELATED APPLICATIONS

This is a divisional application of U.S. patent application Ser. No. 10/003,103 filed on 25 Oct. 2001 entitled "REDISTRIBUTION OF PARTS IN A DISTRIBUTIION NETWORK", the entire contents of which are hereby incorporated by reference, and which claims benefit under 35 U.S.C. § 119(e) of U.S. Provisional Application Ser. No. 60/243,659, filed Oct. 26, 2000, entitled "SYSTEM AND METHOD FOR OPTIMIZED DEPLOYMENT OF INVENTORY, OR REDISTRIBUTION OF EXISTING INVENTORY, ACROSS A MULTI-ECHELON DISTRIBUTION NETWORK."

TECHNICAL FIELD OF THE INVENTION

This invention relates generally to the field of inventory distribution networks and more specifically to redistribution of parts in a distribution network.

BACKGROUND OF THE INVENTION

Distribution networks may include one or more locations that receive parts from a vendor and distribute the parts within the distribution network in order to provide a customer with a product. The parts may be, for example, manufactured into a product within the distribution network. Distribution networks may include locations that both supply parts to and receive parts from other locations. Performance at each location is thus affected by the performance at its suppliers. As a result, maintaining an optimal inventory of parts at each location that best serves the customer while minimizing inventory costs poses a challenge for inventory managers.

SUMMARY OF THE INVENTION

In accordance with the present invention, disadvantages and problems associated with inventory deployment and redistribution techniques are reduced or eliminated.

According to one embodiment of the present invention, redistributing parts includes defining locations. An actual inventory of parts is established among the locations, and a desired allocation of the parts is established among the locations. A demand for the parts at each location is determined using the actual inventory and the desired allocation. Paths are determined, where a path transfers an excess part from one location to another location. A transfer function describing a cost of transferring the excess part along the paths is generated. The transfer function is optimized to achieve the desired allocation of the excess parts at a minimum cost.

Certain embodiments of the invention may provide one or more technical advantages. The present invention may be used to determine an optimized inventory deployment plan that describes the inventory at each location of a distribution network. The inventory deployment plan may optimize the ability of the distribution network to satisfy customer demand while conforming to business constraints. The inventory deployment plan may maximize the ability of each location to fill an order, which may be calculated by minimizing total expected backorders for the network. The present invention may be used to formulate a coverage function that is optimized to determine an optimized deployment of the excess inventory at the excess locations in the network to deficit locations. The coverage function describes the expected ability of each location to completely or partially fill a demand for a part, which may provide an improved measure of customer satisfaction.

The present invention may be used to calculate a demand for a part at a location that accounts for a dependent demand and an independent demand. A dependent demand at a location describes the parts that the location supplies to other locations, and an independent demand at a location describes the parts used at the location. Incorporating the independent and dependent demand into the demand may provide for a more accurate calculation of the demand. The present invention may be used to calculate a demand for a part at a location that takes into account the probability that the part is repaired and placed back into the inventory at the location. By taking into account repaired parts, the calculation of the demand may be more accurate.

The present invention may be used to calculate the availability of a part at a demand location that receives the part from multiple supply locations. The demand location may order a certain proportion of parts from the supply locations in a particular order. The availability takes into account the probability that a supply location supplies a part, given that no other supply location has supplied the part, which may provide a more realistic calculation of availability.

The present invention may be used to restrict the optimization using constraints. Constraints may include, a space limitation at a location and a prohibition on new part purchases, the exclusion of a location from distributing its excess inventory. The present invention may be used to provide an optimized redistribution of inventory among the locations of a distribution network. Inventory of a part may be redistributed if there are excess inventory of this part at some locations and deficit at other locations. The redistribution may be optimized to lower costs associated with transferring parts from one location to another location.

Other technical advantages may be readily apparent to one skilled in the art from the figures, descriptions and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 illustrates an example method for deploying and redistributing inventory of one or more parts among one or more locations;

FIG. 4 illustrates an example method for calculating a demand for one or more parts at one or more locations;

FIG. 5 illustrates an example method for estimating the availability of one or more parts at one or more locations;

FIG. 6 illustrates an example method for formulating a coverage function for one or more parts at one or more locations; and FIG. 7 illustrates an example method for redeploying a part among one or more locations.

DETAILED DESCRIPTION OF THE DRAWINGS

Figure 1:
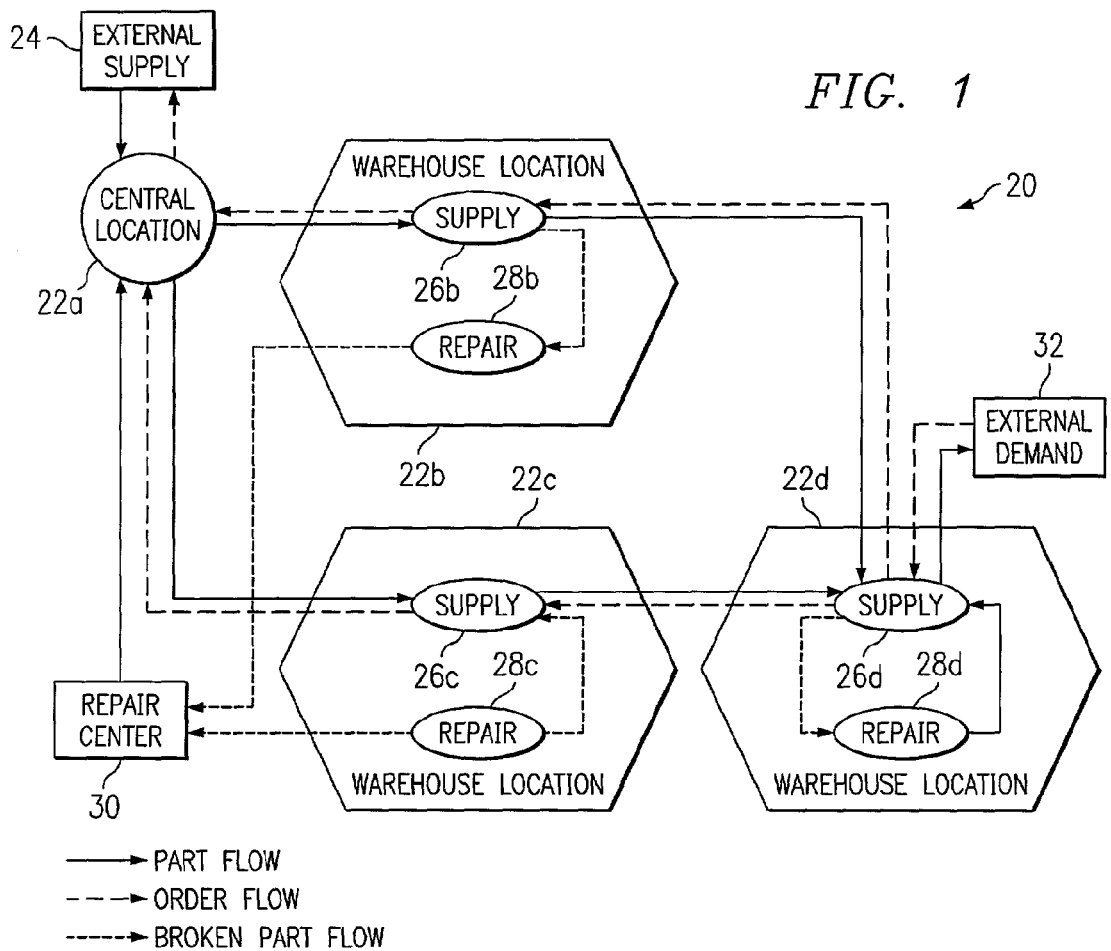
FIG. 1 illustrates an example distribution network for deploying and redistributing inventory of one or more parts among one or more locations.

FIG. 1 illustrates an example distribution network 20 for deploying and redistributing inventory of one or more parts among one or more locations 22. Distribution network 20 includes locations 22 that distribute parts throughout distribution network 20. A part may comprise, for example, a product, a portion of a product, a device used to manufacture a product, or any other suitable item that may be distributed from one location 22 to another location 22 in distribution network 20.

In one embodiment, locations 22 include a central location 22a and one or more warehouse locations 22b-d. Although central location 22a and warehouse locations 22b-d are illustrated, distribution network 20 may include any suitable number of central locations 22 and warehouse locations 22. Each location 22 may comprise a supply location and/or a demand location. A supply location supplies a part to a demand location, and may supply the part in response to an order for the part sent from the demand location. For example, warehouse location 22b supplies parts to warehouse location 22d. For example, warehouse locations 22b-c supply parts to location 22d. A location 22 may comprise both a demand location and a supply location. For example, warehouse location 22b receives parts from central location 22a and supplies parts to warehouse location 22d. A supply endpoint such as central location 22a receives parts from one or more external suppliers 24, for example, a vendor, and distributes the parts to warehouse locations 22b-d. A demand endpoint such as warehouse location 22d provides parts to one or more external demands 32, for example, a customer.

Warehouse locations 22b-d may include supply operations 26b-d and/or repair operations 28b-d. A supply operation 26 sends an order for a part to a supply location, which in response sends the part to supply operation 26. A repair operation 28 may receive a broken part from supply operation 26 and send the broken part to a repair center 30. Repair center 30 repairs the part and sends the repaired part to, for example, central location 22a or back to supply operation 26b. Alternatively, repair operation 28d may receive a broken part from supply operation 26d, repair the part, and send the repaired part back to supply operation 26d.

The inventory for each part at each location 22 is monitored, continuously or periodically. In response to the inventory falling below a predetermined level, an order is placed to bring the inventory position back up to a target level such as an optimized inventory level. A method for deploying inventory of one or more parts among one or more locations to achieve optimized inventory levels is described in more detail with reference to FIG. 2.

Figure 2:
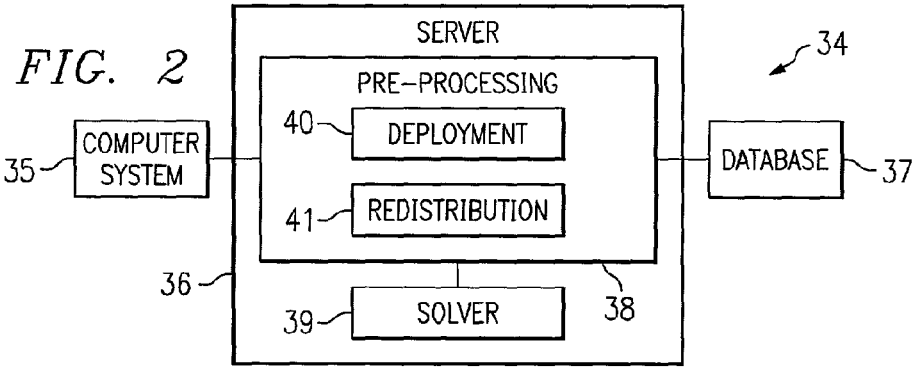
FIG. 2 illustrates an example system that generates optimized inventory deployment and redistribution plans.

FIG. 2 illustrates an example system 34 that generates optimized inventory deployment and redistribution plans. The inventory deployment plan describes a distribution of parts among locations 22 of distribution network 20, and an inventory redistribution plan describes a manner of transferring inventory of parts from the excess locations to the deficit locations to satisfy the inventory deployment plan.

System 34 may include a computer system 35, a server 36, and a database 37, which may share data storage, communications, or other resources according to particular needs. Computer system 35 may include appropriate input devices, output devices, mass storage media, processors, memory, or other components for receiving, processing, storing, and communicating information according to the operation of system 34. As used in this document, the term "computer" is intended to encompass a personal computer, workstation, network computer, wireless data port, wireless telephone, personal digital assistant, one or more microprocessors within these or other devices, or any other suitable processing device.

Server 36 manages applications that generate optimized inventory deployment and redistribution plans. Server 36 includes one or more software components such as a preprocessing module 38 and a solver 39. Preprocessing module 38 may include a deployment module 40 and a redistribution module 41. Deployment module 40 may be used to generate a coverage function and constraints that describes the distribution of parts among locations 22. Solver 39 optimizes the coverage function to determine an optimized distribution of parts. Solver 39 may comprise a mathematical programming solver such as CPLEX by ILOG, INC. Redistribution module 41 may be used to generate a transfer function along with the constraints that describes the transfer of parts among locations 22. Solver 39 optimizes the transfer function to determine a cost optimal manner of redistributing parts.

Database 40 stores data that may be used by server 36. Data may include, for example, the history of the demand for each part at each location 22, the lead time required to transport a part from one location 22 to another location 22, and the maximum space capacity for a location 22. Computing system 35 and database 40 may be coupled to server 36 using one or more local area networks (LANs), metropolitan area networks (MANs), wide area networks (WANs), a global computer network such as the Internet, or any other appropriate wired, optical, wireless, or other links.

FIG. 3 illustrates an example method for deploying inventory of one or more parts among one or more locations 22. Processing module 38 initiates the method at step 46 by defining a number $1, 2, \ldots, i, \ldots, I$ of parts and a number $1, 2, \ldots, j, \ldots, J$ of locations 22. For example, j=1, 2, 3, 4 refer to warehouse locations 22a-d, respectively. At step 48, data is accessed from database 37. Data may include, for example, a demand history of each part at each location 22. The demand history may describe the number of parts that each location 22 requires. Data may include the repair history that may describe the capability of each location 22 to repair a part. Data may include the lanes that may be used to transfer parts between locations 22, along with the costs associated with transporting parts along the lanes. Data may include the cost of purchasing a part, the cost of holding a part in the location as a percentage of the purchase cost for the part, and a fixed cost associated with ordering a part.

At step 50, a demand for each part at each location 22 is calculated. The demand may include a dependent demand and an independent demand. A dependent demand at location 22 describes the parts that location 22 supplies to other locations 22. An independent demand at location 22 describes parts used at location 22. The demand at location 22 may account for the probability that a part is repaired and placed back into the inventory at location 22. Demand may be calculated by starting at a demand endpoint and ending at a supply endpoint of distribution network 20. A method for calculating a demand for a part at each location 22 is described in more detail with reference to FIG. 4.

A replenishment lead time for each part at each location 22 is calculated at step 52. The replenishment lead time for a part at location 22 describes the time required for location 22 to receive the part from another location 22. The replenishment lead time may be computed by starting at a supply endpoint and ending at a demand endpoint. An availability lead-time for each part at each location 22 is estimated at step 54. The availability lead time at a location 22 describes the waiting time due to back order at the location 22 plus the transfer lead time from the supplier to location 22 and the replenishment lead time for the supplier of location 22 A method for estimating the availability lead time of a part at a location is described in more detail with reference to FIG. 5.

A coverage function is formulated at step 56. The coverage function describes the expected ability of a location 22 to completely or partially fill an order for a part, and may be determined from the demand, availability lead time of the part and the inventory level for the part at location 22. The coverage function may be described using the expected backorder of the part at location 22. A method for determining the coverage is described in more detail with reference to FIG. 6.

The required inventory to satisfy the demand for the part at location 22 at hundred percent is computed. The excess inventory of part is determined using the required amount and the actual inventory of part at the location 22. Redistribution of the part inventory may not be required if, for example, all locations 22 have at least sufficient amount to satisfy all demands for the part. If redistribution is not required for any part, deployment module 40 proceeds to step 63 to report on any possible excess and the recommendation of no transfer for the part. If redistribution is required, solver 39 optimizes the coverage function at step 58. Optimizing the overall coverage function may be accomplished by minimizing the sum of expected backorders. At step 60, an optimized inventory level for each part at each location 22 is determined. At step 63 the deployment solver 39 reports the optimized inventory level for each part at each location 22.

At step 62, redistribution module 41 determines the supply and demand for each part at each location from the actual inventory and the optimal deployment. Redistribution module 41 proceeds to step 66 where the transfer function describing the total cost related to transfer of parts between locations 22 is optimized. Minimizing the total cost associated with transporting the parts may optimize the transfer function. A method for determining optimized transfer plans for the parts between locations 22 is described in more detail with reference to FIG. 7. At step 70, the optimized transfer plans, the resulting inventory levels, and possible excess inventory of parts in the network are reported. After reporting the result, the method is terminated.

FIG. 4 illustrates an example method for calculating a demand for one or more parts at one or more locations 22. Deployment module 40 initiates the method at step 80 by selecting a part i. A location j is selected at step 82. Location j may be selected such that the demand at a demand endpoint is calculated first, and the demand at a supply endpoint is calculated last.

At step 84, an independent and the dependent demand for part i at location j is determined. The independent demand for part i at location j may be represented by $\lambda'_{ij}$. The dependent demands for part i at location j may be represented $\lambda_{ik}$, for all k such that k is a demand point for location j. At step 86, the repair capability $r_{ij}$ for part i at location j is determined. The repair capability $r_{ij}$ may be determined from the proportion of demand for part i at location j that is repairable at location j. Starting with demand end points j, the demand $\lambda_{ij}$ for part i is equal to its' independent demand. For any location that is not demand end point the demand $\lambda_{ij}$ for part i is calculated at step 88, and may be calculated using Equation (1):

$$\lambda_{ij} = \lambda'_{ij} + \Sigma(1-r_{ik})\lambda_{ik} \tag{1}$$

k is a demand point for j

At step 90, deployment module 40 determines if there is a next location. If there is no next location, deployment module 40 proceeds to step 92 to determine whether there is a next part for which a demand is to be determined. If there is a next part, deployment module 40 returns to step 80 to select the next part. If there is no next part, deployment module 40 proceeds to step 94 to output the calculated demand for each part at each location. After outputting the demand, the method is terminated.

FIG. 5 illustrates an example method for estimating the availability lead-time of one or more parts at one or more locations 22. Deployment module 40 initiates the method at step 102 by selecting a part i. A demand location j is selected at step 104, and a supply location $l_k$ is selected at step 106. The supply location $l_k$ may be selected from a prioritized list of n supply locations $l_1, \ldots l_n$. For each supply location $l_k$, the list may describe a proportion $C_{il_k j}$ of a demand for part i at demand location j that is scheduled to be satisfied by supply location $i_k$, a probability $\alpha_{ikj}$ that part i is filled at supply location $l_k$ for demand location j, and a lead time $T_{il_k j}$ for a part i to flow from supply location $l_k$ to demand location j. Demand location j and supply location $i_k$ may be selected such that the availability lead-time at a supply endpoint is calculated first, and the availability lead-time at a demand endpoint is calculated last.

At step 108, a probability $Pi_{l_k j}$ of a supply location $l_k$ filling an order for part i placed by a demand location j, given that the order is not filled by another supply location, is calculated. The probability $P_{il_k j}$ for supply location $l_1$ may be computed using Equation (2):

$$P_{il_1 j} = \alpha_{il_1 j} C_{il_1 j} \tag{2}$$

At step 110, deployment module 40 determines whether there is a next supply location $l_k$. If there is a next supply location, deployment module 40 returns to step 106 to select the next supply location. The probability $P_{il_k j}$ of the next supply location is filling an order for the part placed by demand location j, given that the order is not filled by another supply location, may be computed at step 108 using the process described by the recursive Equations (3):

$$P_{il_k j} = \alpha_{il_k j} C'_{il_k j}$$

where $$C'_{il_1 j} = C_{il_1 j}$$

$$C'_{il_k j} = C_{il_k j} + (1-\alpha_{il_{k-1} j})C_{il_{k-1} j} \text{ for } k>1 \tag{3}$$

If there is no next supply location at step 110, deployment module 40 proceeds to step 112 to output the probabilities of the supply locations $l_k$ fulfilling an order for part i placed by demand location j.

At step 113, an availability lead-time $Ti_j$ for the part at each location j is calculated. Availability lead-time $Ti_j$ may be calculated according to the recursive Equation (4):

$$T_{ij} = \sum_{k=1}^{n} \left( T_{il_k j} + \frac{EBO_{il_k}(S_{il_k})}{\lambda_{il_k}} T_{il_k} \right) P_{il_k j} \tag{4}$$

The expected number of back orders EBO ($S_{ij}$) having the inventory level $S_{ij}$ of part i at location j may be defined using Equation (5):

$$EBO_{ij} = \sum_{x=S_{ij}}^{\infty} (x - \chi S_{ij})P(X|\mu_{ij}). \tag{5}$$

At step 114, the replenishment lead-time $\Theta_{ij}$ for part i at demand location j is calculated. The replenishment lead-time $\Theta_{ij}$ for part i at location j may be calculated using Equation (6):

$$\Theta_{ij}=r_{ij}\tau_{ij}+(1-r_{ij})T_{ij} \quad (6)$$

Where $\tau_{ij}$ represents the repair lead time for part i at demand location j, The demand over lead-time or in pipeline value $\mu_{ij}$ of a part i at demand location j is estimated at step 116. The demand over lead-time or in pipeline value may be estimated using Equation (7):

$$\mu_{ij}=\lambda_{ij}\Theta_{ij} \quad (7)$$

At step 118, deployment module 40 determines whether there is a next demand location. If there is a next demand location, deployment module 40 returns to step 104 to select the next demand location. If there is no next demand location, deployment module 40 proceeds to step 120 to determine whether there is a next part. If there is a next part, deployment module 40 returns to step 102 to select the next part. If there is no next part, deployment module 40 proceeds to step 122 to report the lead-time demand of each part at each location 22. After reporting the lead-time demand, the method is terminated.

FIG. 6 illustrates an example method for generating a coverage function for one or more parts at one or more locations 22. Deployment module 40 initiates the method at step 132 by selecting a location j. A part i is selected at step 134.

At step 136, a completely filled demand $D_c$ for part i at location j is calculated at step 136. A completely filled demand $D_c$ may be described by Equation (8):

$$D_c = \sum_{x=0}^{S_{ij}-1} xP(X|\mu_{ij}) \quad (8)$$

where $P(X|\mu_{ij})=e^{-\mu_{ij}}\mu_{ij}^x/x!$ is the Poisson probability mass function for the distribution of demand with mean $\mu_{ij}$. A partially filled demand $D_p$ for part i at location j is calculated at step 138. The partially filled $D_p$ demand may be described by Equation (9):

$$D_p = \chi(S_{ij}-1)\left[1-\sum_{x=0}^{S-1}P(X|\mu_{ij})\right] \quad (9)$$

where $\chi$ is the percentage of partial fill allowed for the part. At step 140, a coverage function for part i at location j is determined. The coverage function for part i at location j describes the expected proportion of filled demand for part i at location j, and may be expressed using Equation (10):

$$\left\{\sum_{x=0}^{S_{ij}-1}xP(X|\mu_{ij})+\chi\sum_{x=S}^{\infty}(S_{ij}-1)P(X|\mu_{ij})\right\}/\mu_{ij}= \quad (10)$$

$$\left\{\sum_{x=0}^{S_{ij}-1}(x-\chi(S_{ij}-1))P(X|\mu_{ij})+\chi(S_{ij}-1)\right\}/\mu_{ij}$$

At step 142, deployment module 40 determines whether there is a next part. If there is a next part, deployment module 40 returns to step 134 to select the next part. If there is no next part, deployment module 40 proceeds to step 144 to determine whether there is a next location. If there is a next location, deployment module 40 returns to step 132 to select the next location. If there is no next location, deployment module 40 proceeds to step 146 to determine the coverage function for the number of parts at the number of locations. The coverage function may be expressed as the weighted average of coverage for the parts at locations. The coverage function for the parts at the locations may be expressed by the expression (11):

$$\sum_{j=1}^{J}\left\{\sum_{i=1}^{I}(\beta_{ij}/\mu_{ij})\left[\sum_{x=0}^{S_{ij}}[x-\chi S_{ij}]P(X|\mu_{ij})+\chi S_{ij}\right]\right\}/\sum_{i=1}^{I}\mu_{ij} \quad (11)$$

where $\beta_{ij}$ represents a weight of part i, which may be based on an importance measure of part i. At step 148, constraints for the coverage function may be defined. Constraints may include, the following:

The total number of part i used is less than or equal to the total initial on hand inventory of part i, which may be expressed by Equation (12)

$$\sum_{j=1}^{J}S_{ij} \leq \sum_{j=1}^{J}IOH_i \forall i \quad (12)$$

The total volume occupied by parts at each location j is less than or equal to the volume capacity limit $V_j$ at location j, which may be expressed by Equation (13):

$$\sum_{i=1}^{I}v_iS_{ij} \leq V_j, \forall j \quad (13)$$

and the stock levels $S_{ij}$ are integers.

At step 150, the coverage function is converted to a Backorder function. Using the backorder function may provide for a simpler optimization process. The backorder function may be expressed as in (14):

$$\sum_{j=1}^{J}\sum_{i=1}^{I}EBO_{ij}(S_{ij}) \quad (14)$$

Minimizing the expected backorder is equivalent to maximizing the expected coverage. The constraints may be expressed by Equations (15):

$$\sum_{j=1}^{J}S_{ij} \leq \sum_{j=1}^{J}IOH_i \forall i \quad (15)$$

$$\sum_{i=1}^{I_i}v_iS_{ij} \leq V_j, \forall j$$

$S_{ij}$ are integers

At step 154, the coverage function and constraints may be linearized in order to allow the coverage function to be optimized by solver 39. To linearize the coverage function and constraints, the non-linear terms of the coverage function and constraints may be approximated by linear terms. The non-linear terms are discrete and convex, so a first-order linear approximation using the finite difference for two neighboring discontinuous points may be used to approximate each non-linear term. Each non-linear term in the coverage function and the constraints is replaced with a continuous variable t, and a linearization constraint that describes the under estimation at points of discontinuity is added to the constraints.

The objective function that measures expected backorder as expressed by Equation (14), may be linearized according to expression (15):

$$\sum_{j=1}^{J}\sum_{i=1}^{L} t_{ij}. \tag{15}$$

The linearization constraint may be expressed by Equation (16):

$$t_{ij} \geq m_{ij}(X - X_{ij}) + b_{ij}, \forall S_{ij} < X_{ij} \leq S_{upper}, \forall i,j \tag{16}$$

where $m_{ij}=P(X>X_{ij}|\mu_{ij})$, $b_{ij}=P(X>X_{ij}|\mu_{ij})(X-X_{ij})+EBO_{ij}(X_{ij}+1)$, and $S_{upper}$ is the upper bound on the inventory for part i at location j. Other constraints may be expressed by Equations (37):

$$\sum_{j=1}^{J} S_{ij} \leq \sum_{j=1}^{J} IOH_i \forall i \tag{17}$$

$$\sum_{i=1}^{I_1} v_i S_{ij} \leq V_j, \forall j$$

$S_{ij}$ are intergers, $\forall i = 1, \ldots, I_2, \forall j$

After linearizing the coverage function, the method is terminated.

FIG. 7 illustrates an example method for redeploying a part among one or more locations 22. Redistribution module 41 initiates the method at step 170 by receiving from database 37 an actual inventory and an optimized inventory for the part at each location 22. The optimized inventory may be determined according to a method described with reference to FIG. 3. At step 172, a demand $D_j$ for the part at each location j is determined. The demand for the part at location j may be computed from the difference between the optimized inventory for the part at location j and the actual inventory for the part at location j. A positive demand $D_j$ represents a demand or deficit for the part at that location, while a negative demand $D_j$ represents a supply or excess for the part at that location.

A dummy location may be added to distribution network 20. The dummy location may be defined as a location with a positive demand $D_j$ equal to the difference between the total excess and the total demand. The dummy node acts as a sink to attract left over excess of the part in the network. A path set for each location j is established at step 174. A path set for location j may be defined by Out(j), which lists the paths on which parts may be transported from location j to another location k.

A transition matrix that describes the paths between locations is initialized at step 176. The transition matrix may be defined as, for example, a J-by-J matrix T, where T[j,k] is true if location j is connected by a path to location k, and it is false otherwise. Setting the elements of T equal to false may initialize transition matrix T. At step 178, a location j is selected.

Other locations k that are connected to location j are determined at step 180. The following process may be used to determine locations k:

```
Let LIST = {j}
    While (LIST is not empty)
        Remove an element m from LIST
        Let T[j,m] = true
        For k in Out(m)
            If (T[j,k] ≠ true)
                Add k to LIST
            End if
        End for
    End while
```

At step 182, redistribution module 41 determines whether there is a next location. If there is a next location, redistribution module 41 returns to step 178 to select the next location. If there is no next location, redistribution module 41 proceeds to step 184 to output transition matrix T.

At step 186, a transfer cost $C_{jk}$ associated with transferring the part from location j to location k is determined for each path. The paths to the dummy location may be associated with an infinite transfer cost. A transfer cost function is optimized by solver 39 at step 188. The transfer cost function for each part may be defined by Equation (18):

$$\sum_{j=1}^{J}\sum_{k=1}^{I} C_{jk} X_{jk} \tag{18}$$

where $X_{jk}$ represents the number of the part transferred from location j to location k. Constraints for the transfer cost function may include, constraints defined by Equations (41):

$$\sum_{j} X_{jk} - \sum_{j} X_{kj} = D_k, \forall k \tag{19}$$

$X_{jk} \geq 0$ are integers

Optimization of the transfer cost function results in a set of triplets $(j,k,X_{jk})$, where each triplet represents an optimal transfer. At step 190, the optimal transfers are reported. After reporting the transfers, the method is terminated.

Certain embodiments of the invention may provide one or more technical advantages over previous inventory deployment and redistribution techniques. The present invention may be used to determine an optimized deployment plan for the existing inventory in a distribution network 20. The inventory deployment plan may optimize the ability of distribution network 20 to satisfy customer demand using only the existing inventory while conforming to business constraints. The inventory deployment plan may maximize the contribution of the part to the systems ability to fill an order, which may be calculated by minimizing overall expected backorder for the distribution network. The present invention may be used to formulate a coverage function that is optimized to determine an optimized inventory deployment plan. The coverage function describes the expected ability of each location 22 to completely or partially fill a demand for a part, which may provide an improved measure of customer satisfaction.

The present invention may be used to calculate a demand for a part at a location 22 that accounts for a dependent demand and an independent demand. A dependent demand at a location 22 describes the parts that location 22 supplies to other locations 22, and an independent demand at location 22 describes the parts used at location 22. Incorporating the independent and dependent demand into the demand may provide for a more accurate calculation of the demand. The present invention may be used to calculate a demand for a part at a location 22 that takes into account the probability that the part is repaired and placed back into the inventory at location 22. By taking into account the repaired parts, the calculation of the demand may be more accurate.

The present invention may be used to calculate the availability of a part at a demand location 22 that receives the part from multiple supply locations 22. Demand location 22 may order a certain proportion of parts from supply locations 22 in a particular order. The availability takes into account the probability that a supply location 22 supplies a part, given that no other supply location 22 has supplied the part, which may provide a more realistic calculation of availability.

The present invention may be used to restrict the optimization using constraints. Constraints may include the prohibition of new purchases, and a space limitation at each location 22. The present invention may also be used to determine an optimized inventory redistribution plan that provides a balance between the excess and deficit for a part among locations 22 of distributed network 20. Parts may be redistributed if an actual inventory does not meet an optimized inventory. The redistribution may be optimized to lower costs associated with transferring parts from one location 22 to another location 22.

Although an embodiment of the invention and its advantages are described in detail, a person skilled in the art could make various alterations, additions, and omissions without departing from the spirit and scope of the present invention as defined by the appended claims.

What is claimed is:

1. A computer-implemented system for redistributing a part, comprising:
    a server system coupled with one or more databases, the server system comprising:
       means for defining a plurality of locations including at least one dummy location;
       means for establishing an actual inventory of a plurality of parts among the plurality of locations;
       means for establishing a desired allocation of the plurality of parts among the plurality of locations;
       means for determining a demand for the plurality of parts at each of the plurality of locations using the actual inventory and the desired allocation;
       means for determining a plurality of paths, each path operable to transfer at least one of the plurality of parts from one of the plurality of locations location to another one of the plurality of locations;
       means for generating a transfer function describing a cost of transferring a plurality of excess parts along the plurality of paths; and
       means for optimizing the transfer function to achieve the desired allocation of the plurality of excess parts at a minimum cost.

2. The system of claim 1, wherein the transfer function describes a cost associated with transferring the plurality of excess parts along a plurality of alternative paths.

3. The system of claim 1, wherein the server further comprises means for optimizing the transfer function by minimizing the transfer function.

4. The system of claim 1, wherein the server further comprises means for determining the plurality of paths by sending a notification if there is no path between one location and another location.

5. The system of claim 1, wherein the server further comprises means for establishing the desired allocation by calculating an optimized allocation of the plurality of excess parts among the plurality of locations.

6. The system of claim 1, wherein the dummy location comprises a positive demand for attracting the plurality of excess parts.

7. The system of claim 1, wherein the plurality of paths includes at least one path to the dummy location that is associated with an infinite transfer cost.

8. The system of claim 1, wherein the dummy location comprises a positive demand, the positive demand is the difference between a total excess and a total demand.

9. The system of claim 1, wherein the server further comprises means for satisfying a constraint requiring that the parts transferred to one of the plurality of locations and the parts transferred from the one of the plurality of locations satisfy the demand for the parts at the one of the plurality of locations.

* * * * *